United States Patent [19]

McNamara et al.

[11] Patent Number: 5,399,417
[45] Date of Patent: Mar. 21, 1995

[54] CAST METAL-POLYMERIC ARTICLES

[75] Inventors: James F. McNamara, Kennett Square, Pa.; Edward A. Miller, Newark, Del.; David M. Pentenburg, Powell, Ohio; Arnold W. Raymond, Newark, Del.

[73] Assignee: E. I. Du Pont de Nemours and Company, Wilmington, Del.

[21] Appl. No.: 72,901

[22] Filed: Jun. 7, 1993

[51] Int. Cl.$^6$ ................................................ B32B 9/00
[52] U.S. Cl. ..................... 428/216; 428/209; 428/290; 428/336; 428/372; 428/407; 428/458; 428/473.5; 264/126; 264/323

[58] Field of Search ............ 428/473.5, 458, 260, 428/209, 407, 290, 422, 216, 336, 401, 372; 264/126, 323

[56] References Cited

U.S. PATENT DOCUMENTS 3,179,614  4/1905  Edwards ......................... 428/21
4,238,538  12/1980  Manwiller ....................... 428/36

*Primary Examiner*—Patrick J. Ryan
*Assistant Examiner*—Abraham Bahta
*Attorney, Agent, or Firm*—Andrea Malinowsky; Donald Huntley

[57] ABSTRACT

Bearing compositions having a polymeric core and cast outer metal exhibit excellent structural integrity in use.

5 Claims, 1 Drawing Sheet

CAST METAL-POLYMERIC ARTICLES

BACKGROUND OF THE INVENTION

Polyimides and similar polymers have long been used in a variety of applications in which high temperatures are encountered. Accordingly, shaped articles of polyimide have been used as bushings, seals, electrical insulators, compressor vanes, piston rings, gears, thread guides, brake linings, and clutch facings. In view of the high cost of polyimide materials, and for greater flexibility in performance characteristics, it is often desirable to combine polyimide with other materials such as metal. In this context, a continuing need exists for economical and efficient methods of combining polyimide with metals.

SUMMARY OF THE INVENTION

The present invention provides articles comprising non-melt processable high temperature polymers and metal which can be easily and economically fabricated.

Specifically, the instant invention provides an article comprising:
(A) a shaped insert of non-melt processable polymer having a cross sectional thickness of at least about 1 mm; and
(B) cast metal containing the insert.

The invention further provides a process for the preparation of non-melt processable polymer articles comprising:
(A) forming a shaped insert of non-melt processable polymer having a thickness of at least about 1 mm; and
(B) casting molten metal around the insert to contain the insert, the metal having a melting point of at least about 400° C., the insert and the cast metal having an interlocking configuration.

BRIEF DESCRIPTION OF THE DRAWINGS

The figures are cross sectional illustrations of cast metal-polymeric articles according to the present invention.

DETAILED DESCRIPTION OF THE INVENTION

Non-melt processable polymers which can be used in the present invention include those that have no melting point below their decomposition temperature or a melting point greater than about 370° C. Such polymers include, for example, polyimides and polybenzimidazoles.

A wide variety of polyimides can be used in the present invention, including those described in Edwards, U.S. Pat. No. 3,179,614, hereby incorporated by reference. The polyimides described therein are prepared from at least one diamine and at least one anhydride. Preferred diamines which can be used include m-phenylene diamine (MPD), p-phenylene diamine (PPD), oxydianiline (ODA), methylene dianiline (MDA) and toluene diamine (TDA). Preferred anhydrides which can be used include benzophenone tetracarboxylic dianhydride (BTDA), biphenyl dianhydride (BPDA), trimellitic anhydride (TMA), pyromellitic dianhydride (PMDA), maleic anhydride (MA) and nadic anhydride (NA).

Preferred polyimides which can be used in the present invention include those prepared from the following combinations of anhydride and diamine: BTDA-MPD, MA-MDA, BTDA-TDA-MDA, BTDA-MDA-NA, TMA-MPD & TMA-ODA, BPDA-ODA & BPDA-PPD, BTDA-4,4'-diaminobenzophenone, and BTDA-bis (p-aminophenoxy) -p,p'-biphenyl. An especially satisfactory polyimide in the present invention is that prepared from pyromellitic dianhydride and 4,4'-oxydianiline.

The polymeric component of the present invention can also contain fillers of the type typically used in polyimide compositions, such as graphite. Typically such fillers are used in quantities up to about 45% of the total polymeric composition.

Particularly preferred graphites which can be used in the present invention are those which are substantially free from reactive impurities, that is, those impurities which have an adverse effect on the oxidative stability of blends with polyimides. In general, the graphite should have less than about 0.15 wt. % of such reactive impurities, and preferably less than about 0.10 wt. %. Typical of such reactive impurities are metal oxides and sulfides, and particularly ferric sulfide, barium sulfide, calcium sulfide, copper sulfide, barium oxide, calcium oxide, and copper oxide.

The non-melt processable polymer, according to the present invention, is formed into a shaped insert. The shape will necessarily vary with the intended use for the polyimide. For example, in bearing applications, cylinders of substantially circular cross section are formed. Typically, for bearing applications, a central aperture is formed within the cylinder.

Figure 1:
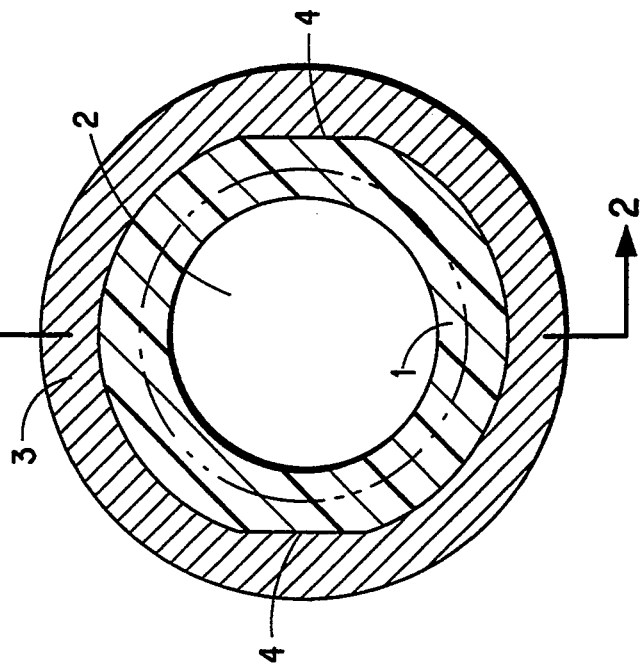

In accordance with the present invention, the cast metal contains the insert. In the simplest embodiment of the invention, as illustrated in FIG. 1, the cast metal substantially surrounds the insert. There, non-melt processable polymer 1 is the general form of a right circular cylinder. Aperture 2 is formed in the middle of the cylinder. Cast metal 3 substantially surrounds the cylinder. On the outer diameter of the cylinder, retaining means 4 is provided in the form of a flattened section of the outer diameter of the cylinder. This prevents movement of the polymer component in relation to the cast metal in a circumferential direction. Other non-circular shapes or perimetral irregularities for the insert can be used to provide a positive mechanical interlocking configuration of the polymeric and cast metal component, and thus prevent an circumferential movement, as will be evident to those skilled in the art.

A positive mechanical interlocking configuration means movement is limited without requiring use of chemical bonding, frictional force, or adhesives.

Figure 2:
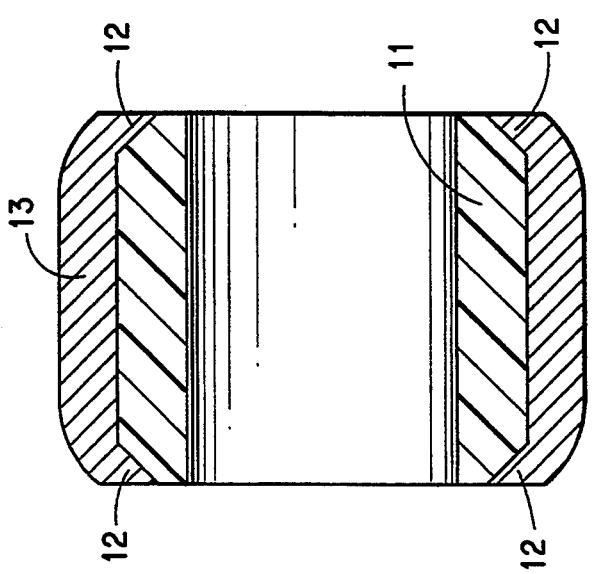

Further restriction of motion can be provided by alternative retaining means in the longitudinal or axial direction, as illustrated in FIG. 2. FIG. 2 is a cross-sectional illustration of an article of the present invention shown in FIG. 1 taken parallel to the central aperture. There, the non-melt processable polymer insert 11 has its corners 12 chamfered so that the cast polymer 13 is prevented from longitudinal movement relative to the insert.

Figure 3:
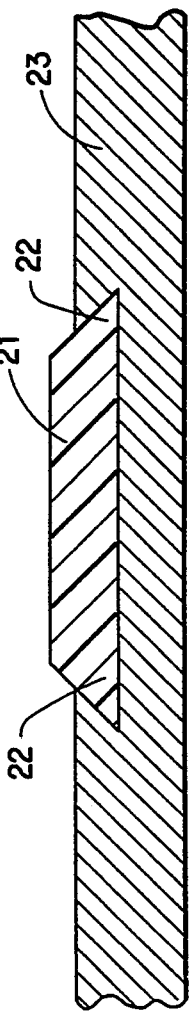

FIG. 3 is a cross-sectional illustration of an article of the present invention in which the non-melt processable polymer is intended as a wear strip. There, the non-melt processable polymer 21 is in a trapezoidal configuration. Corners 22 of the polymer are contained by cast metal 23.

Metals which can be used in the present invention include those having a melting point of at least about 400° C. Such metals include, for example, aluminum, antimony, barium, magnesium, and zinc, as well as castable alloys of one or more of the above. Aluminum and its alloys have been found to be particularly satisfactory in the present invention. Alloys are typically formulated to balance the flow properties in the molten state and the physical properties of the alloy in its final configuration.

In accordance with the present invention, the metal is cast to contain the non-melt processable polymer. As indicated above, such containment can be in the form of substantially complete encapsulation, for example, where the polymer is in the form of a cylindrical bearing. In the alternative, such containment can be partial, such as the situation in which the metal contains a corner of the shaped polymer insert or a retaining tab.

The high temperature, non-melt fabricable polymer can be formed into the desired shape by the techniques usually used for such materials, such as direct forming, direct forming with secondary machining, or molding of particulate resin with elevated temperature and pressure.

The cast metal in the finished articles is characterized by the dendritic crystalline structure characteristic of cast metals. The dendrites are a configuration that has a tree-like branching pattern. The dendrites, as will be evident to those skilled in the art, are formed as the metal cools through the solidifying stage. The casting process can be carried out by a variety of conventional casting operations. For example, sand or investment casting techniques can be used. Typically, however, die casting into metal molds has been found particularly effective for the present invention.

The present invention permits the preparation of articles combining metal and non-melt fabricable polymer in an efficient and cost-effective manner. Surprisingly, the contact of the polymer with the molten metal has been found to not depreciate the polymer to a significant extent, so long as the polymer is present in the required minimum cross-sectional thickness of about 1 mm. The required thickness, for example, in a cylindrical bearing component, is measured as the thickness of the wall of the cylindrical component as opposed to the overall diameter of the bearing.

The present invention is further illustrated by the following specific example.

EXAMPLE

An insert of polyimide prepared from oxydianiline and pyromellitic dianhydride was machined from a solid direct formed blank. The insert had the following nominal dimensions; 24 mm outside diameter × 21 mm inside diameter × 9.5" thickness. Chamfers were machined at the outside diameter on each face. Two flats, 180° apart, were machined on the outside diameter. The latter two machining steps were done to prevent axial and rotational movement of the insert relative to the die casted metal.

The polyimide insert was then placed on a metal core-pin in a die casting mold. The mold was closed, capturing the insert inside. The mold was preheated to a temperature of 204° C.

After the mold was closed, a molten aluminum alloy was injected into the mold cavity. The temperature of the molten metal was 704° C. The mold was kept closed for 20 seconds while the molten metal cooled and solidified. The mold was then opened and the hybrid part (die cast metal and polyimide insert) was removed and allowed to cool to room temperature. The total cycle time for this operation was 30 seconds.

After the hybrid pan reached room temperature, the inside diameter was measured. Measurements showed the metal shrinkage caused the inside diameter of the insert to be reduced by a nominal 0.33 min. The inside diameter also had a taper of 0.15 mm to 0.18 mm. It is believed the taper is caused by the two different metal masses of the die cast part, the larger mass causing the inside diameter to be reduced more than the smaller mass. Inspection of the finished part indicated no effect on the surface finish of the inside diameter of the polyimide.

We claim:
1. Non-melt processable polymer articles comprising:
   (A) a shaped insert of non-melt processable polymer having a cross sectional thickness of at least about 1 mm; and
   (B) cast metal containing the insert, the insert and the cast metal having a positive mechanical interlocking configuration that limits movement between the shaped insert and the cast metal in any axis or rotation.
2. An article of claim 1 wherein the non-melt processable polymer consist essentially of polyimide.
3. An article of claim 1 wherein the polyimide is prepared from oxydianiline and pyromellitic.
4. An article of claim 1 wherein the metal is selected from the group consisting of aluminum, antimony, barium, magnesium and zinc and castable alloys thereof.
5. An article of claim 3 wherein the metal consists essentially of aluminum or a castable alloy of aluminum.

* * * * *